Patented Dec. 14, 1937

2,101,947

UNITED STATES PATENT OFFICE 2,101,947

COHERENT POROUS ZIRCONIUM SILICATES

Charles J. Kinzie, Niagara Falls, N. Y., assignor to The Titanium Alloy Manufacturing Company, New York, N. Y., a corporation of Maine No Drawing. Application July 29, 1933, Serial No. 682,795

REISSUED

10 Claims. (Cl. 106—9)

My invention relates generally to the production of porous articles consisting of zirconium silicate which may be employed for filtration purposes, gas dispersions and the like as well as for abrasive tools and refractories.

The objects of my invention are, among other things, to produce porous articles of this character that will inherently possess a high degree of stability and resistance to contact with chemicals, such articles consisting chiefly of zirconium silicate that also withstands high temperatures, qualities that are not possessed by other materials such as aluminum oxide, silica, zirconia and the like.

I have practiced my invention successfully in a number of different ways, and the following examples will disclose to others how my novel porous zirconium silicate is advantageously prepared and produced.

*Example A.*—Granular zirconium silicate ($ZrSiO_4$),—60+200 in size, is mixed with sufficient sodium zirconium silicon citrate solution to yield a semi-dry mixture (damp).

The sodium zirconium silicon citrate solution referred to contained the following parts by weight:—

| | |
|---|---|
| Silicon (calculated as $SiO_2$) | 4.07 |
| Zirconium (calculated as $ZrO_2$) | 7.96 |
| Carbon in solution | 8.21 |
| Sodium (calculated as $Na_2O$) | 5.95 |

This sodium zirconium silicon citrate solution as used in this example may be prepared as follows:—

The first step consists in decomposing finely-milled zirconium silicate by heating with an alkali, sodium carbonate for example, at temperature of about 900–950° C. to yield a product readily soluble in dilute acids. Other alkalis such as sodium hydrate, sodium peroxide and sodium sulphide, or mixtures thereof, may be used; also potassium compounds such as potassium carbonate.

This roasted product consisting of sodium zirconium silicate is preferably milled with water to very fine state. The following charge will illustrate the procedure I prefer to use:

| | Parts by weight |
|---|---|
| Sodium zirconium silicate | 100 |
| Water | 96 | are wet milled in a suitable ball mill until less than ½ of 1% remains on a 325 mesh sieve when a sample is tested for fineness. The mill is discharged, and the slurry thus obtained which consists mainly of sodium zirconium silicate in water suspension will have composition approximately as follows:—

| | Percent |
|---|---|
| Zirconium (calculated as $ZrO_2$) | 20.65 |
| Silicon (calculated as $SiO_2$) | 10.49 |
| Sodium (calculated as $Na_2O$) | 14.06 |
| Water, etc. | 54.80 |
| | 100.00 |

For most purposes I prefer to proceed directly with the solution by means of citric acid, but in some cases it will be preferable to first remove the water soluble material from the slurry before proceeding with the dissolving of the zirconium, silicon and alkali in citric acid. The water dissolved material consists mainly of any excess alkali as well as small amounts of sodium aluminate, and sodium silicate, traces of chromium, vanadium manganese, etc. which may be removed simply by separating the sodium zirconium silicate solids from the small amount of dissolved material by any suitable mechanical means. The water insoluble sodium zirconium silicate is then brought back to the form of slurry by dilution with water, and the solution in citric acid effected in same manner as in the preferred direct treatment procedure, but reducing the amount of citric acid in proportion to amount of material removed.

The alternative step of washing with water prior to solution in citric acid may prove important in case cruder ores are used or in case of ores or materials in which there is an excess of silicon mineral.

In case of mineral such as zirkite is used as raw material, it is desirable to add free silica so that proportion of $ZrO_2$ to $SiO_2$ is approximately 65 $ZrO_2$—35 $SiO_2$.

The sodium zirconium silicon citrate solution proper is then prepared as follows:—

I first form a charge of the following ingredients:

| | Parts by weight |
|---|---|
| Sodium zirconium silicate slurry | 100 |
| Citric acid ($CO_2H.CH_2)_2C(OH)CO_2H$) | 59.1 |
| Water | 63.5 |

Preferably I first dissolve the citric acid in the water at about 80–90° C., and then add by suitable dispensing equipment this heretofore produced sodium zirconium silicate slurry to the citric acid solution which is stirred by suitable means. The sodium zirconium silicate dissolves almost completely leaving a small amount of insoluble residue which if recovered will constitute less than two parts of the 100 parts of sodium zirconium silicate slurry used. This represents a conversion of approximately 94% of the zircon originally used into dissolved condition. Whether this small amount of insoluble matter is removed from the citrate solution is of no importance; if retained the dried product would be more or less opaque.

The solution formed has a slight acid reaction and in contact with iron has a mild reactive effect with the iron. I have found that if the solution is neutralized by any suitable alkaline substance,—ammonium hydrate for example,—and preferably made slightly alkaline, it then does not effect iron and may be handled without detriment in iron vessels. The neutralizing may be effected either before or after removing the insoluble residue.

After settling out the small amount of insoluble residue, the essentially clear neutral or slightly alkaline solution is then decanted and upon analysis has approximately the following composition:

|  | Percent |
|---|---|
| Silicon (calculated as $SiO_2$) | 4.07 |
| Zirconium (calculated as $ZrO_2$) | 7.96 |
| Titanium (calculated as $TiO_2$) | 0.02 |
| Iron (calculated as $Fe_2O_3$) | 0.01 |
| Carbon (C) | 8.21 |
| Sodium (calculated as $Na_2O$) | 5.95 |
| Water | 73.78 |
|  | 100.00 |

Index of refraction 1.490–1.495
Specific gravity 1.325.

In the above table the percentage listed for zirconium (calculated as $ZrO_2$) also includes small amounts of aluminum and rare earths. In the event a cruder zircon was used these impurities would of course be proportionately higher.

The amount of solution required may vary from one part to twelve parts by weight of the solution to one-hundred parts of the granular zirconium silicate or zircon, but I have found that about seven parts by weight of the solution is generally satisfactory.

The mixture is formed into suitable shape, for instance, by pressing into a suitable form and drying same.

The object is then burned to about 1200° C. to form the finished article which is a porous material consisting of $ZrSiO_4$ grains bonded together by the residual products of the sodium zirconium silicon citrate mainly sodium, zirconium silicate.

The citrate solution referred to I have found to be an excellent bonding agent, effectively bonding throughout the temperature range from room temperature to the maturing point of the objects formed.

*Example B.*—100 parts granular zircon ($ZrSiO_4$) as in Example A are compounded with 2 parts sodium zirconium silicate powder containing

|  | Percent |
|---|---|
| Silicon calculated as $SiO_2$ | 20.58 |
| Zirconium calculated as $ZrO_2$ | 40.48 |
| Sodium calculated as $Na_2O$ | 27.57 |
| Balance moisture, etc | 11.37 |
|  | 100.00 |

Sufficient water is then added to make a stiff mixture which is then mixed and shaped into form of the desired finished article.

A small amount of acid substance, such as HCl, may be added to this mix prior to formation to assist in setting the mixture or the object which, after formation, may be subjected to acid vapors such as those of HCl which will set the sodium zirconium silicate.

Acid substances other than HCl fumes may also be used, such as fumes of $SO_2$ or fumes of $H_2SO_4$, fumes of nitric acid, or liquid acids such as $H_2SO_4$, $HNO_3$, or phosphoric acid would also be effective.

In any event the formed object is burned to about 1200° C. to form the porous object.

In this example there may also be used instead of sodium zirconium silicate, other silicates such as sodium silicate, potassium zirconium silicate, barium zirconium silicate, calcium zirconium silicate or magnesium zirconium silicate. When either of the latter are used the temperature may be increased or decreased to yield a sufficiently bonded article.

*Example C.*—100 parts zirconium silicate ($ZrSiO_4$) granules are prepared as in Example A. Then

|  | Parts |
|---|---|
| Silicon tetrachloride ($SiCl_4$) | 1.38 |
| Zirconium tetrachloride ($ZrCl_4$) | 2.00 | are dissolved in about 5 parts of water, and mixed with the zirconium silicate granules. If allowed to stand, the mix will finally set to a hard mass; this setting may be hastened by the contact with $NH_3$ gas, or by mixing in a little $NH_4OH$ water or a little phosphoric acid, either one of which will assist to hasten the setting, if such procedure is desired.

Before the charge sets hard, it should be formed into desired shape, and then dried and burned to form a zirconium silicate article free of any alkaline bonding substance.

This method of Example C for many purposes is preferred over Examples A and B, because the bond of $ZrO_2$—$SiO_2$ residual matter is more insoluble in chemicals as compared with the alkali or alkaline earth bonded zircon of Examples A and B. A suitable firing temperature range may be from about 800° C. to 1500° C. depending upon the requirements of article produced.

The amount of the zirconium-silicon bond may be varied to suit the method of processing, and either of the two chlorides can be used alone, although I prefer to use the two in the proportions given so as to maintain in the finished article the $ZrO_2:SiO_2$ ratio as in the zircon itself.

In place of $ZrCl_4$, zirconium oxychloride ($ZrOCl_2$) may be used. Other alkali free salts of zirconium such as the nitrate or oxylate might also be used instead of the chloride.

The porosity of the zirconium silicate objects may of course be varied by using finer or coarser zirconium silicate. If an object of very large pores is desired, it may be produced by first making a porcelain-like zircon body from milled zircon, for example (—325 mesh zircon), and then mixing with any one of the three bonding agents referred to in Example A, B or C, or with other suitable bonds, and then burning the mix to a temperature high enough to form a porcelain-like zircon material which in itself is non-porous or practically so. This body is then crushed and sized to yield aggregates of suitable size which are then processed as in Example A, B or C at will, by varying the proportions of the bond to effectively form the article which is then fired at temperatures suitable to bond the zircon aggregates into the object of desired porosity.

In Examples A, B and C, simple and effective methods have been set forth for producing porous zircon articles. Obviously other means can be applied to form similar articles of zircon.

For example, the zircon might be mixed with a fusible natural or synthetic mineral, such as ilmenite, ferrous titanate or rutile ($TiO_2$), and sufficiently bonded with a temporary bond such as tar or pitch by mixing the zircon, tar or pitch and mineral bond together. If tar is used, the mix may be cold formed and then burned, while if pitch is to be used, the mix may be heated to the melting point of the pitch, and then formed and burned finally to a temperature sufficient to melt the mineral bond.

The temperature for ilmenite will be about 1300° C., while for rutile a temperature of about 1500° C., should be used. In place of the mineral bond a mixture of materials to yield a glass might also be used, or better still a powdered glass; again there might likewise be used a porcelain powder or such minerals as the feldspars might also be used.

In Example A the residual product that bonds the granular zirconium silicate is mainly sodium zirconium silicate which apparently at the temperatures used acts upon the surfaces of the $ZrSiO_4$ particles slightly to react therewith, thereby coalescing and adhering to such zircon particles. I believe the residue in Example C consists of $ZrO_2$ and $SiO_2$ that bonds the zircon particles by mechanical adherence without reaction.

It is obvious that there might also be admixed with the zircon other granular materials such as silica sand, corundum, natural or synthetic, or silicon carbide (SiC). Generally I prefer so to compose the mixture that the final porous article will consist of zirconium silicate ($ZrSiO_4$) grains or aggregates bonded in any suitable manner to yield a porous article which will serve in its various forms and fabrications the multitude of uses for which such porous objects are suitable.

Such uses for my improved zirconium silicates in porous forms may be enumerated as follows:—

1. As filter plates in filtrations of various kinds.
2. As diaphragms in electrolysis.
3. As instruments to disperse gases as these are led into liquids such as in the case of absorbing gases in liquids, the function being, by means of suitable connections to the porous zircon object in the liquid, to force the gas through the multitude of pores and into the liquid in a multitude of fine bubbles which are more readily absorbed than are the larger bubbles.
4. As separating plates for purpose of separating two liquids which are purposely brought together slowly.
5. As refractory objects in combustion equipment having effect of intimately contacting the combustible gas with the gaseous oxidizing agent.
6. As an abrasive material.
7. As a super-refractory material for objects required to stand high temperatures.

In the appended claims such substances used as the bonding agents which I have described comprise compounds of metals and metalloids that under the temperatures applied will decompose though still effectively binding the individual zirconium silicate particles together, and will be generically designated as a "zirconium and silicon containing salt". The constituent proportion is preferably that as contained in zircon.

I claim as my invention:

1. The method of making porous zirconium silicates which comprises mixing natural zircon grains with an aqueous solution of a zirconium and silicon containing salt, adding an ammonia vapor to aid in setting the mixture, shaping the mixture to form, and then burning same at temperatures between 800° and 1500° C.

2. The method of making porous zirconium silicates which comprises mixing synthetic aggregates of zircon with an aqueous solution of a zirconium and silicon containing salt, shaping the mixture to form, subjecting the form to an ammonia vapor to set same, and then burning same at temperatures between 800° and 1500° C.

3. The method of making coherent porous zirconium silicates which comprises mixing granular zirconium silicate with an aqueous solution of a zirconium and silicon containing salt, adding a small amount of phosphoric acid to aid in setting the mixture, shaping the mixture to form and drying same, and then burning the dried form at temperatures between 800° and 1500° C.

4. The method of making coherent porous zirconium silicates which comprises mixing granular zirconium silicate with a sodium zirconium silicon citrate solution, shaping the mixture to form and drying same, and then burning the dried form at temperatures between 800° and 1500° C.

5. The method of making porous zirconium silicates which comprises mixing natural zircon grains with aggregates of a burned porcelain-like zircon material, adding an aqueous solution of a zirconium and silicon containing salt and a small amount of ammonia solution to aid in setting the mixture, shaping the combined charge to form, and then burning same at temperatures between 800° and 1500° C.

6. In the method of making coherent porous zirconium silicates from a mixture of granular zirconium silicate and an aqueous solution of a zirconium and silicon containing salt as a bonding agent and a small amount of ammonia solution to aid in setting the mixture, the step which consists in burning said mixture at temperatures between 800° and 1500° C., said bonding agent forming a viscous glass to cause interstitial adherence between the particles of granular zirconium silicate.

7. In the method of making coherent porous zirconium silicates from a mixture of granular zirconium silicate and an aqueous solution of a zirconium and silicon containing salt and a small amount of ammonia solution to aid in setting the mixture, the step which consists in burning said mixture at temperatures between 800° and 1500° C. to cause coalescence between the residue of said salt as a viscous glass and the particles of granular zirconium silicate.

8. The method of making coherent porous zirconium silicates which comprises mixing granular zirconium silicate with a sodium zirconium silicon citrate solution in the ratio of about 100 parts of the granular zirconium silicate to from 1 to 12 parts by weight of said citrate solution, shaping the mixture to form and drying same, and then burning the dried form at temperatures between 800° and 1500° C.

9. The method of making coherent porous zirconium silicates which comprises mixing granular zirconium silicate with powdered sodium zirconium silicate in the ratio of about 100 parts of the granular zirconium silicate to 2 parts by weight of the sodium zirconium silicate, adding to the charge sufficient water with an acid substance to form a stiff mixture and shaping same to form, and burning the form at about 1200° C.

10. A coherent fired porous zirconium silicate comprising granular zirconium silicate interstitially bonded with the coalesced residue of a sodium zirconium silicon citrate solution consisting mainly of sodium zirconium silicate.

CHARLES J. KINZIE.